Figure 3:
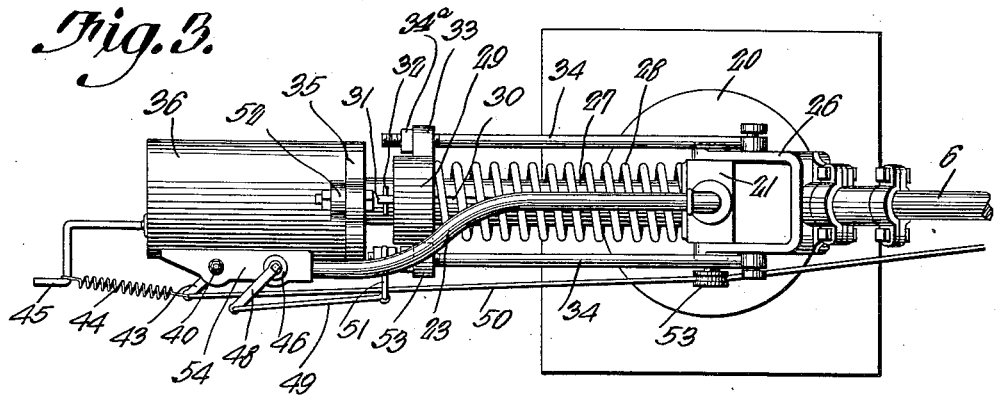

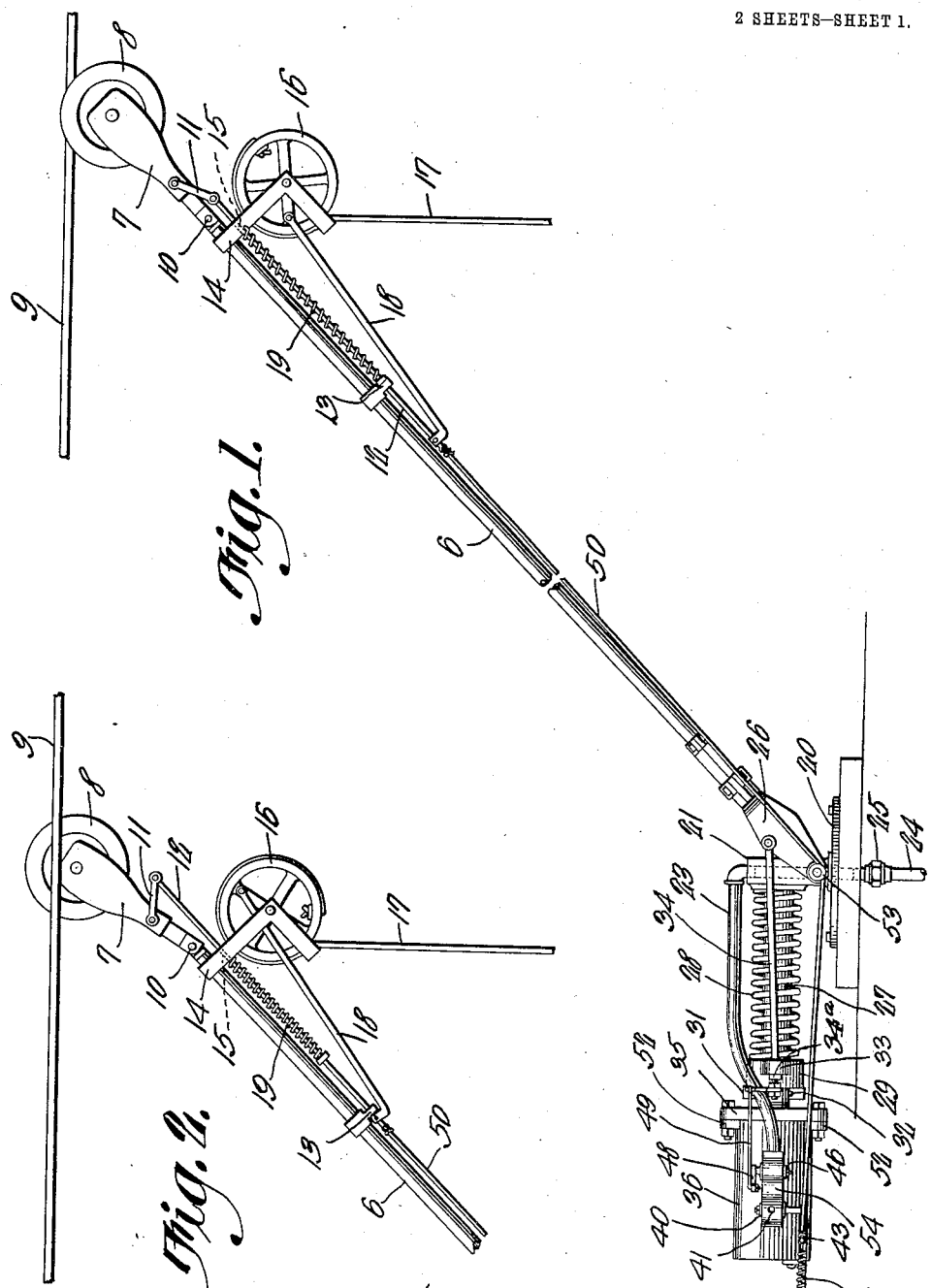

C. B. RODGERS & J. A. BRENNAN.
TROLLEY POLE RETRIEVER.
APPLICATION FILED JUNE 14, 1912.

1,077,558.

Patented Nov. 4, 1913.

2 SHEETS—SHEET 2.

Witnesses

Charles B. Rodgers and
James A. Brennan Inventors by C. A. Snow & Co.
Attorneys

UNITED STATES PATENT OFFICE.

CHARLES B. RODGERS AND JAMES A. BRENNAN, OF BORDENTOWN, NEW JERSEY.

TROLLEY-POLE RETRIEVER.

1,077,558.  Specification of Letters Patent.  Patented Nov. 4, 1913.

Application filed June 14, 1912. Serial No. 703,743.

*To all whom it may concern:*

Be it known that we, CHARLES B. RODGERS and JAMES A. BRENNAN, citizens of the United States, residing at Bordentown, in the county of Burlington, State of New Jersey, have invented a new and useful Trolley-Pole Retriever, of which the following is a specification.

This invention relates to trolley pole retrievers and for its primary object contemplates the production of means for automatically lowering or depressing the trolley pole when the trolley wheel leaves the trolley, so that the trolley pole cannot interfere with the overhead construction should the trolley wheel jump from or leave the trolley wire.

As a further object, the present invention aims to provide a trolley pole retriever which shall be positive in operation to automatically depress the trolley pole when the trolley wheel leaves the trolley wire, and which shall be locked against accidentally returning to inoperative position when the trolley pole is depressed.

This invention further aims to provide in connection with the device as above indicated, a trolley rope so connected to the actuating mechanism as to permit the same to be released, thus permitting the trolley pole to be again raised in order to engage the trolley wheel with the trolley wire.

A further object of the present invention is to provide means whereby the retriever is actuated to permit the pole to be depressed with accelerated motion so that the trolley pole will not be depressed rapidly at first, so as to have the tendency to strike the roof of the car or effect other injuries.

Among its other objects, the present invention aims for the production of a device of this character which shall be simple in construction and operation; which shall be positive in action regardless of what happens to the trolley pole; which shall need little, or no attention after installation; which shall be practical, efficient and economical; which shall be applicable to present trolley poles without changes detrimental to standard construction; and which shall be subject to severe usage.

The invention has been illustrated in its preferred embodiment in the accompanying drawings, wherein like reference characters have been employed to denote corresponding parts and wherein:—

Figure 4:
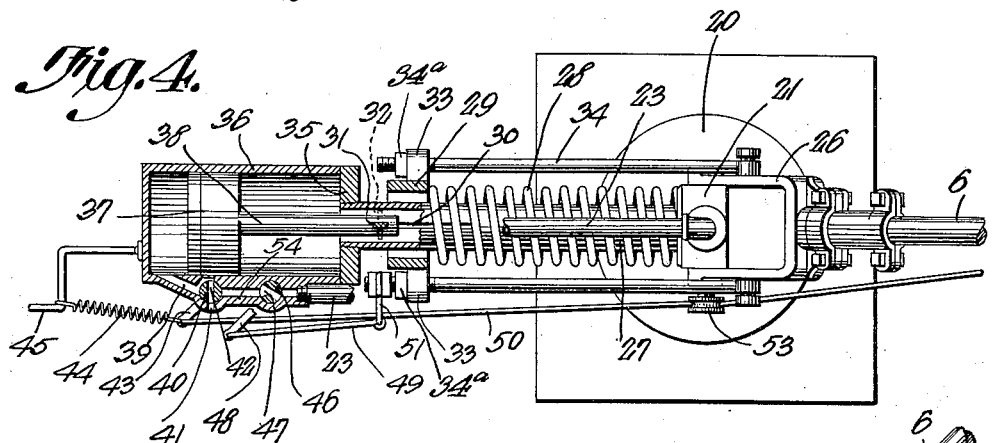
Figure 5:
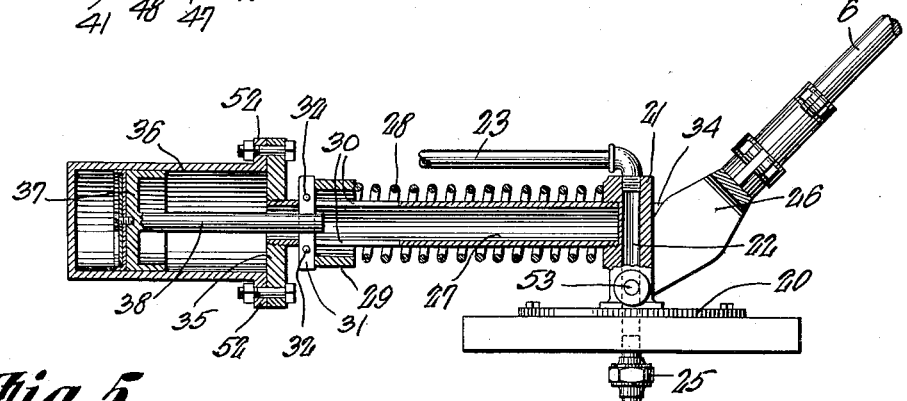

Figure 1 is a side elevation of a standard trolley pole and associate parts, embodying the present invention. Fig. 2 is a side elevation of the upper end of a trolley pole embodying the present invention and showing the parts positioned when the trolley wheel has left the trolley wire. Fig. 3 is a plan view on an enlarged scale of the base of the trolley pole and the attachments thereto. Fig. 4 is a view similar to Fig. 3, parts being shown in section. Fig. 5 is a vertical longitudinal section of the parts shown in Fig. 3.

Referring in detail to the drawings, the numeral 6 designates the trolley pole, which is of standard construction, and which has the trolley harp 7 pivoted to the upper end thereof by a knuckle-joint as designated by the numeral 10. The harp 7 carries the trolley wheel 8, which under normal conditions engages the trolley wire 9. The knuckle joint 10 is so designed that the harp 7 is constrained against swinging downwardly, but is permitted to swing upwardly, as will be clear by reference to Figs. 1 and 2. On the lower end of the trolley pole 6 is secured the usual fork 26 which is pivoted to the sides of a standard 21, which standard is pivoted at its lower end to a base 20. This base 20 is designed to be secured to the roof or top of the car, and the standard 21 being pivoted or swiveled to the base 20, permits the trolley pole to be swung at various angles, as when the car is rounding a curve, or to permit the trolley pole to be swung toward one end or the other according to the direction of travel. A tubular horizontal guide 27 is attached at one end to the standard 21 and has a head or collar 29 slidably arranged thereon. A coiled compression spring 28, of suitable tension, is disposed between the head 29 and the standard 21, and a pair of connecting rods 34 connect the ears 33 projecting from the opposite sides of the head 29 and the respective arms of the fork 26. The spring 28 being under compression tends to swing the trolley pole upwardly, as customary, and the foregoing parts are of standard construction and are used in the present trolley pole construction. According to standard construction, the connecting rods 34 pass slidably through the ears 33 and each one has a nut or stop 34ᵃ on its outer end adapted to contact with the corresponding ear 33 of the head 29. It will thus be observed that the spring 28 will normally force the head 29 outward against the nuts 34ᵃ on the outer ends of the connecting rods so as to give an upward tension to the trolley pole.

In carrying out the present invention, the tubular guide 27 is provided with diametrically opposite longitudinal slots 30, and a cylinder head 35 is attached to the free end of the said guide. A fluid pressure cylinder 36 having one end open, has its open end attached to the cylinder head 35, the said cylinder having ears 52 projecting from its open end which are bolted to the head 35. The cylinder 36 is thus conveniently carried by the guide for the spring 28 which gives an upward tension to the trolley pole. A piston 37 works within the cylinder 36 and a piston rod 38 is attached to the piston and projects into the tubular guide 27. A bar 31 is carried by the free end of the piston rod 38 and passes through the slots 30 in the guide 27 to contact with the outer face or end of the head 29, cotter pins 32 being passed through the bar 31 on the exterior of the guide 27 to retain the said bar in position. It will therefore follow, that when the piston rod 38 is forced inwardly or toward the standard 21, the member 31 will force the head 29 inwardly against the tension of the spring 28, which will relieve the trolley pole 6 of the tension of the spring and permit same to gravitate.

The connecting rod 24 in slidably engaging the head 29 will permit the head to be forced inwardly by the inward movement of the piston, so that the trolley pole may gravitate. Thus, the pressure upon the piston acts directly on the spring and no force is applied to the trolley pole, the trolley pole gravitating by its own weight and the nuts 34ᵃ in contacting with the ears 33 serving to limit the downward movement of the trolley. The movement of the trolley pole is retarded for the reason that the nuts 34ᵃ in contacting with the ears 33 will cause the spring 38 to be brought under greater compression which will serve to cushion the downward movement of the trolley pole.

The cylinder 36 is provided at one side with an enlargement or rib 54, and to the inner end of the rib 54 is attached one end of a pipe 23. The standard 21 is also provided with a vertical bore 22 passing therethrough, and the pipe 23 is connected to the upper end of the bore 22. The lower end of the bore 22 is connected to the air cylinder of the car by means of a pipe 24, which pipe is preferably connected to the standard 21 by means of a swivel joint 25, thus permitting the standard to turn without interference. The rib 54 is provided with a duct or channel 39 communicating with the pipe 23 and with the outer end of the interior of the cylinder, so that it will be seen that compressed air or other fluid under pressure may be passed into the cylinder in rear of the piston 37, the duct 39, pipe 23, bore 22, and pipe 24 providing an air or fluid pressure line communicating with the cylinder.

A valve or plug 46 is pivoted in the rib 54, and has a duct or passage 47 therethrough which is adapted to register with the duct 39. A lever 48 is attached to the valve 46, and the said lever is connected by a link 49 to an arm 51 carried by the corresponding rod 34. This valve 46 is normally partially open as shown in Fig. 4 so as to permit the restricted passage of the air or fluid, and when the head 29 is moved inwardly or toward the standard 21, the said valve is opened farther so as to increase the fluid supply to the cylinder. In this manner, it will follow, that when air is permitted to pass through the air line into the cylinder, the supply will be restricted at first, so that the piston 37 is forced inwardly slowly, which will permit the trolley pole to fall slowly at first, and then as the head 29 is forced inwardly, the valve 46 will be opened farther so as to increase the fluid supply and to accelerate the downward movement of the trolley pole.

A second valve or plug 40 is pivoted in the rib 54 intermediate the valve 46 and the cylinder and is provided with a duct or passage 42 adapted to be brought into registration with the duct 39. The rib 54 is also provided with a discharge opening or outlet 41 extending from its exterior to the valve 40, and when the valve 40 is turned out of registration with the duct 39, the duct 42 of the valve will be brought into registration with the outlet 41, the other end of the duct 42 being still in communication with that portion of the duct 39 leading to the cylinder, so as to permit the egress of air or fluid from the cylinder. A lever 43 is secured to the valve 40, and to the said lever is secured a contractile spring 44 attached to a bracket 45 secured to the other end of the cylinder 36. This spring 44 normally tends to swing the valve 40 closed, or in position to permit the fluid to be discharged from the cylinder.

The cylinder 36 and associate parts provide the retriever proper, and from the foregoing, it will be noted that when the lever 43 is swung so as to turn the duct 42 of the valve 40 into alinement with the duct 39, the fluid which is under pressure, will be forced into the cylinder 36 in rear of the piston 37 so as to move the head 29 inwardly against the tension of the spring 28 and to thereby permit the trolley pole to gravitate slowly, due to the restricted passage of air through the valve 46. Then as the trolley pole is depressed, the valve 46 will be opened therewith which will cause the trolley pole to be moved downwardly with an accelerated motion. This prevents the trolley pole from moving downwardly rapidly at first so as to gain enough momentum to strike the roof of the car to the probable injury of the roof of the car or trolley pole.

In order to bring the retrieving mechanism aforesaid into operation when the trolley wheel leaves the trolley wire, there has been provided the following mechanism: A bracket 14 is attached to the upper end of the trolley pole, and a guide 13 is attached to the pole below the bracket 14. A rod 12 is guided through the guide 13 and bracket 14, and is connected at its upper end to the sides of the harp 7 by two links 11, only one being shown. A retractile coiled wire spring 19 is arranged on the rod 12 between the guide 13 and bracket 14 and connects the said rod and bracket in order to give an upward tension to the rod and in order to give an upward tension to the harp 7. A cord or other flexible member 50 is attached to the lower end of the rod 12 and passes over a guide pulley 53 on the standard 21, with the other end thereof attached to the lever 43 of the valve 40. The rod 12 when raised or slid upwardly pulls the cord 50 taut, which will swing the lever 43 against the tension of the spring 44 in order to open the valve 40, to permit of the admission of fluid in the cylinder. When the rod 12 is slid inwardly or downwardly against the tension of the spring 19, the cord 50 will be slackened so that the spring 44 will swing the lever 43 in order to close the valve 40, and when the rod 12 is slid inwardly, the free ends of links 11 will project downwardly or inwardly and ordinarily when the trolley wheel 8 is in engagement with the trolley wire 9, the upward tension of the trolley pole 6 will prevent the harp 7 from swinging upwardly due to the tension of the spring 19. As soon as the trolley wheel 8 jumps from or leaves the trolley wire 9, the harp 7 will be free to swing upwardly, which action is caused by the tension of the spring 19 forcing the rod 12 upwardly. The rod 12 in being forced upwardly or outwardly by the spring 19 will swing the links 11 beyond a right angle position relative to the harp so that the rod 12 is held against accidental retrograde movement sufficient to permit the retrieving mechanism to return to inoperative position. The said rod is thus prevented from returning to its initial or normal position, unless done so manually. It will therefore be seen, that when the trolley wheel leaves the trolley wire so that the harp is swung upwardly, the cord will be drawn taut in order to open the valve 40 and permit of the admission of fluid into the cylinder which will cause the trolley pole to be depressed as above described. Thus, should the trolley wheel or harp strike any part of the overhead construction, so as to tend to swing the harp back into normal position, there will be no tendency of the retrieving mechanism from being brought into inoperative position so as to permit the trolley pole to be again raised, but on the other hand the harp would tend to slide the rod 12 farther outward The links 11 in being swung outwardly beyond a right angle position relative to the harp will lock the retrieving mechanism against accidentally returning to inoperative position and prevent the accidental raising of the trolley pole.

As a means for releasing the rod 12 and for releasing the retrieving mechanism, a sheave 16 has been pivoted in the bracket 14, and a link 18 is connected at its ends to the sheave 16 and the lower end of the rod 12. The trolley rope 17 is attached to the sheave 16, so that when the rod 12 is forced outwardly, the link 18 will partially rotate the sheave 16, thus winding the trolley rope 17 upon the sheave. By pulling the trolley rope 17 downward, the sheave 16 will be rotated reversely, which will force the link 18 downward, in order to move the rod 12 downward to release the retrieving mechanism. In this manner, when the trolley rope 17 is drawn downward, the retrieving mechanism will be released, thus permitting the trolley pole to again come under tension, due to the spring 28, and the trolley wheel 8 may be again positioned in engagement with the trolley wire, as will be understood.

From the foregoing, taken in connection with the drawings, it will be clearly apparent that when the trolley wheel 8 jumps from or leaves the trolley wire 9, the harp 7 will be thrown or swung upwardly relative to the trolley pole by the spring 19 forcing the rod 12 outwardly, so that the cord 50 is drawn taut in order to open the valve 40. The valve 40 being open permits the admission of fluid into the cylinder 36 so as to force the piston outwardly and force the head 29 against the tension of the spring 28, permitting the trolley pole to drop by gravity. It will also be noted that as the trolley pole drops, the valve 46 will be opened farther in order to accelerate the movement of the pole, and to prevent the pole from dropping rapidly at first so as to gain sufficient momentum to strike the roof of the car as hereinbefore indicated. The trolley pole will thus be depressed or dropped as soon as the trolley wheel leaves the trolley wire and will be locked in such position, until the trolley pole is given the attention of the motorman, conductor, or other attendant. It will be further noted, that should the trolley wheel or harp 7 accidentally engage the overhead construction, there will be no tendency to release the retrieving mechanism, this being of advantage for the reason that should the trolley wheel leave the trolley wire when rounding curves, the trolley pole will not be permitted to rise after once being dropped, so as to engage any of the overhead stays or cross wires. Then as soon as the trolley rope 17 is drawn downwardly, the harp 7, rod 12, and links 11 will again be set in normal position, and at the same time the retrieving mechanism will be thrown out of operation, permitting the spring 28 to raise the trolley pole and permitting the person manipulating the rope 17 to bring the trolley wheel into engagement with the trolley wire. The mechanism is thus set conveniently, and the trolley wheel 8 being brought into engagement with the trolley wire will again prevent the rod 12 from moving outwardly until the trolley wheel again leaves the trolley wire, as above described, in which event the same operation will ensue.

With the construction and combination of parts as set forth and illustrated in the accompanying drawing, it will appear that the objects aimed at are attained in an effective manner, and it is understood, that this invention is susceptible of numerous alterations or deviations in its details within the scope of the appended claims without departing from the spirit of the invention.

Having thus described the invention, what is claimed as new is:—

1. The combination of a spring pressed trolley pole, retrieving means therefor, a harp pivoted to the pole, guides carried by the pole, a rod slidable through the guides and operatively connected to the retrieving means, a link connecting the rod and harp and adapted to swing beyond a position at right angles to the harp, and means for yieldingly sliding the rod to bring the retrieving means into operation.

2. The combination of a spring pressed trolley pole, retrieving means therefor, a harp pivoted to the pole, guides carried by the pole, a rod slidable through the guides and operatively connected to the retrieving means, a link connecting the rod and harp and adapted to swing beyond a position at right angles to the harp, means for yieldingly sliding the rod to bring the retrieving means into operation, and means for sliding the rod against the tension of the last mentioned means.

3. The combination of a spring pressed trolley pole, retrieving means therefor, a harp pivoted to the pole, guides carried by the pole, a rod slidable through the guides and operatively connected to the retrieving means, a link connecting the rod and harp and adapted to swing beyond a position at right angles to the harp, means for yieldingly sliding the rod to bring the retrieving means into operation, a trolley rope operatively connected to the said rod for sliding the said rod against the tension of the last mentioned means.

4. The combination of a spring pressed trolley pole, retrieving means therefor, a harp pivoted to the pole, guides carried by the pole, a rod slidable through the guides and operatively connected to the retrieving means, a link connecting the rod and harp and adapted to swing beyond a position at right angles to the harp, means for yieldingly sliding the rod to bring the retrieving means into operation, a sheave carried by the pole, a link connecting the sheave and rod, and a trolley rope wound upon the sheave so as to slide the said rod against the tension of the last mentioned means when the rope is unwound.

5. The combination of a spring pressed trolley pole, a spring pressed harp pivoted thereto, a fluid pressure cylinder, a piston in the cylinder and connected to the trolley pole, a fluid pressure supply pipe connected to the cylinder, a valve for the said pipe and normally partially open, the said valve being connected to the trolley pole, so that the valve is opened farther as the trolley pole is depressed, and a second valve for the said pipe normally closed and connected to the harp so that the last mentioned valve is opened when the harp is swung relative to the pole.

6. In combination of a spring pressed trolley pole, a spring pressed harp pivoted thereto, a fluid pressure cylinder, a fluid pressure supply pipe connected to the cylinder, a piston working within the cylinder and connected to the trolley pole, a valve for the said pipe normally closed and connected to the harp so that the said valve is opened when the harp is swung relative to the pole, and means for normally restricting the passage of fluid through the said pipe, and for increasing the passage of fluid as the pole is depressed.

7. In combination of a pivoted standard, a trolley pole pivoted thereto, a spring pressed harp pivoted to the pole, a guide secured to the standard, a head slidable on the guide, a compression spring on the guide between the head and standard, a connecting rod attached to the head and pole, a fluid pressure cylinder attached to the free end of the guide, a piston in the cylinder connected to the said head, a fluid pressure supply pipe connected to the cylinder, a valve for the fluid pressure pipe normally partially open, means connecting the said valve and head for farther opening the said valve as the head is forced against the tension of the respective spring, a second valve for the said pipe normally closed to permit the escape of fluid from the cylinder, yielding means for normally closing the last mentioned valve, and a flexible connection between the last mentioned valve and the harp to open the last mentioned valve when the harp is swung relative to the pole.

In testimony that we claim the foregoing as our own, we have hereto affixed our signatures in the presence of two witnesses.

CHAS. B. RODGERS.
JAMES A. BRENNAN.

Witnesses:
EDWARD MANOR,
JAS. A. FITZPATRICK.

Copies of this patent may be obtained for five cents each, by addressing the "Commissioner of Patents, Washington, D. C."